Oct. 8, 1935.  O. B. NICHOLS  2,016,554
CULINARY APPLIANCE
Filed June 18, 1934  2 Sheets-Sheet 1
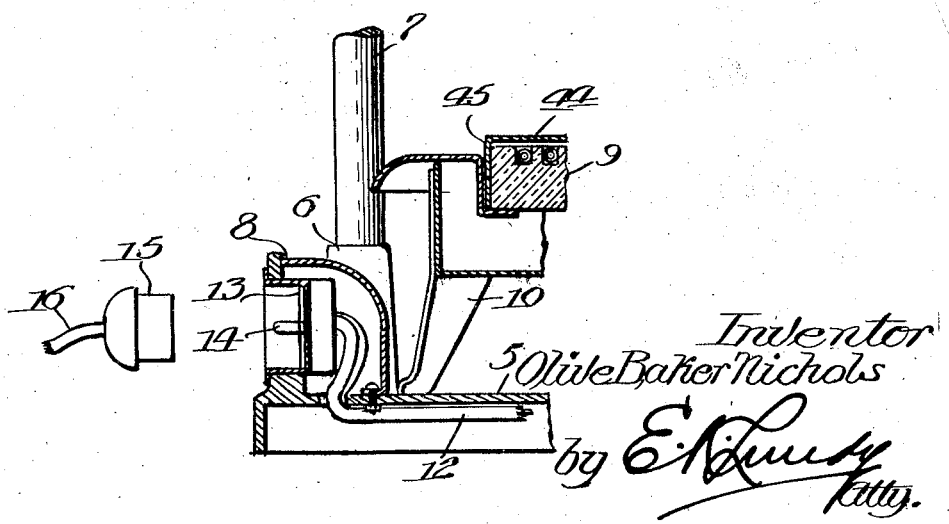

Oct. 8, 1935.   O. B. NICHOLS   2,016,554
CULINARY APPLIANCE
Filed June 18, 1934    2 Sheets-Sheet 2
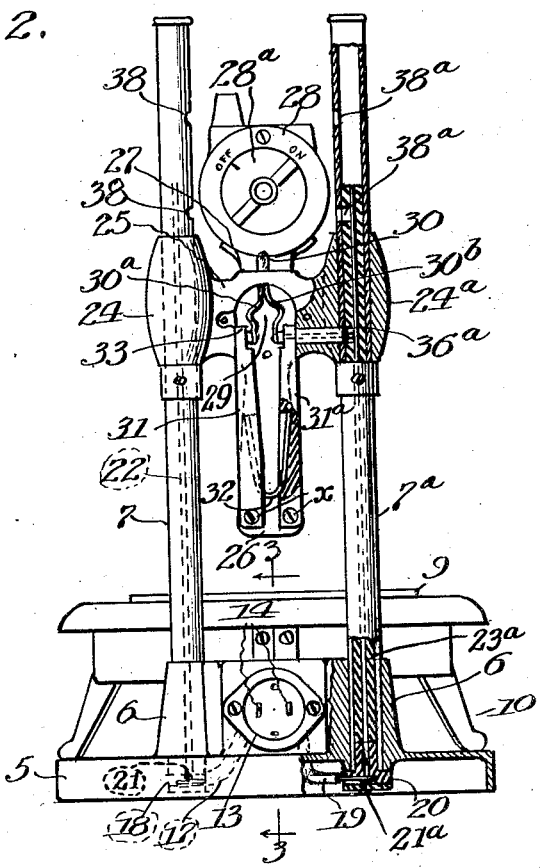
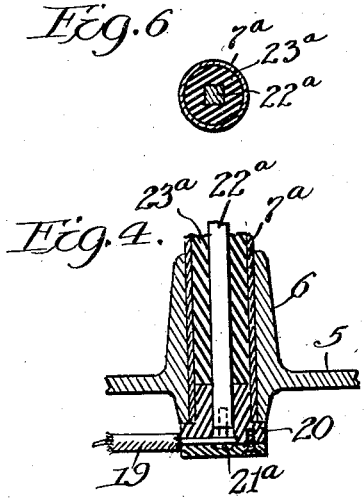
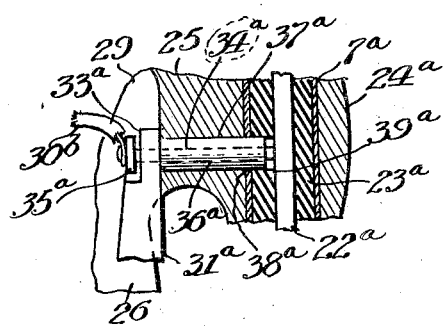

Patented Oct. 8, 1935

2,016,554

UNITED STATES PATENT OFFICE 2,016,554

CULINARY APPLIANCE

Olive Baker Nichols, Chicago, Ill.

Application June 18, 1934, Serial No. 731,058

12 Claims. (Cl. 172—36)

My invention relates to a culinary appliance and has particular reference to a structure having general utility in the preparation of foodstuffs.

An appliance of this character may be employed, for example, as a stirrer, whipper or beater, and arrangements are made in my apparatus whereby the food-stuff under preparation may be readily heated during the time it is operated on by the agitator.

Provision is also made to prevent the ingredients being treated from splashing out of the bowl or receptacle during the period they are under the influence of the agitator devices.

I have also provided means whereby ingredients may be readily added to those being agitated in the bowl or receptacle without the necessity of removing the splash-preventing cover or lid. The agitator and the heater are electrically operated and in this connection I have provided novel means whereby the conductor wires are safely and conveniently enclosed and concealed in the support and standard of the appliance and cannot interfere with the ready operation of the device.

Also, I have devised a novel and convenient structure for mounting the agitator so that it may be readily adjusted and latched in different positions with respect to the heater and the base in which the latter is disposed.

In connection with the foregoing structure I have provided a novel means for forming electrical connection between the electric motor that drives the agitator and the electric conductors, which means are operated by and simultaneously with the operation of the devices for latching the bracket that supports the motor in its various adjusted positions. It will be noted that these means are arranged in a manner so that when the bracket and motor have been elevated to a position for the convenient removal of the bowl or receptacle in which the mixing or agitation takes place it will be impossible to close the electric circuit and the agitator will be "dead" and cannot be operated. This avoids liability of the operator becoming injured by the agitator as well as prevents promiscuous scattering or splashing of the ingredients being mixed or stirred in the bowl whenever the agitator is lifted out of the bowl or container.

The apparatus which I have devised is novel and simple in construction; its parts are sturdy so that they will withstand severe usage; it is effective in performing its functions; it may be readily operated by persons unfamiliar with mechanical or electrical apparatus; and it is economical to manufacture so that it may be sold to the user for a reasonable retail price. Further objects and advantages will be apparent to persons skilled in the art after my invention is understood.

I prefer to practice my invention and to accomplish its numerous objects in substantially the manner hereinafter described and as more particularly pointed out in the claims. Reference is herein made to the accompanying drawings that form a part of this specification.

In the drawings:—

Figure 1 is a vertical side elevation of my culinary appliance.

Figure 2 is a view of the rear thereof with portions in section and broken away to disclose interior construction.

Figure 3 is a fragmentary vertical section on line 3—3 of Fig. 2, looking in the direction of the arrows.

Figure 4 is an enlarged view of the portion shown in section at the bottom of Figure 2.

Figure 5 is an enlarged vertical sectional view of the latching and make-and-break devices.

Figure 6 is a cross-section of one of the guide rods of the standard.

The accompanying drawings illustrate a typical or preferred embodiment of my invention, and in said drawings like reference characters are used to designate like parts wherever said parts appear in the different views.

The structure preferably comprises a substantially rectangular shaped base 5 having tubular embossments 6, arising from the upper surface adjacent the rear edge, and mounted in these embossments is a standard in the form of a pair of parallel upright tubular guide rods, 7, 7ª. A boxlike hollow housing 8 is formed integrally with and connects the embossments, the purpose of which will hereinafter be more fully explained. It will be noted that the base, the embossments and the housing are in one integral piece, being preferably cast of a light-weight metal such as aluminum, and the base is cored out to reduce its weight and to provide reinforcement in the form of lateral flanges or webs in the well-known manner.

An electric heating plate 9 is attached to the upper surface of the base, in front of the embossments 6, by means of legs 10 that are secured to the base in any suitable manner so as to elevate the heater a desired distance above the base 5 as shown in Figure 1.

This heater 9 may be any well-known construction consisting of coils of resistance wire arranged in concentric or spiral channels formed in a plate of porcelain, lava or other suitable insulating material; said plate being seated in the central depression of an annular frame or ring so that the edge of said plate is spaced from the adjacent wall of the frame and an annular groove is provided therebetween. The electric current to the resistance coils is controlled through a switch 11 mounted below the front edge of the heater, said switch being interposed in a circuit formed by an insulated conductor cord 12 that passes down through an aperture in the base and leads to the rear where it passes up through the base and enters the housing 8 and is connected into the main lead-in circuit.

The rear wall of housing 8 has a socket 13 in which metal electric terminals 14 are mounted so that a suitably slotted electric plug or connector element 15 on the adjacent end of a conductor cord 16 may be removably inserted to form an electric connection with a source of current supply.

The motor rotates one or more vertically disposed clamps or chucks 4 that removably receive the upper portions of spindles 3 that carry the whipper or beater elements 2.

Within the housing 8 one of the terminals is connected to a wire 17 that leads under the base 5 to a junction in a fiber block 18 mounted on the lower end of the guide rod 7 of the standard while the other terminal is similarly connected by a wire 19 to a junction in a fiber block 20 on lower end of the other guide rod 7ª. The blocks 18 and 20 are of insulating material and are separable to permit the wires 17 and 19 to pass between the respective parts so that they may be connected by screws 21, 21ª, or otherwise to the metal conductor strips 22 and 22ª that extend upwardly in the respective guide rods 7, 7ª, of the standard. In order to insulate the strips 22, 22ª from the respective rods the latter are fitted with fillers 23ª, one of which is detailed in Figs. 4, 5, and 6, said fillers being of insulating material such as "bakelite" that are circular in cross-section and have diameters slightly less than the inner diameters of these tubular rods. These fillers have longitudinal bores to receive the conductor strips and thereby insulate them from the rods.

A sliding frame or carrier supporting an electric motor is adjustably mounted on the standard so that it may be moved up and down thereon, and devices are provided for maintaining this structure in various positions on the standard area closing an electric circuit for driving the motor.

The frame or carrier consists of elongated oval shaped bosses 24, 24ª that are axially bored to slidably fit the respective guide rods and are connected by an intermediate vertical web 25 that has a handle shaped extension 26 projecting downwardly from its central portion between the guide rods. Above the handle extension there is a horizontal saddle or seat 27 projecting forwardly from the web, upon which an electric motor 28 is secured, and said saddle, said intermediate web with its handle, together with the bosses are preferably cast integrally of metal such as aluminum. The back of the web is hollowed out to provide a recess 29 that is closed by a suitable cover plate (not shown) and the electric conductor cord 30 from the motor enters this recess and has its circuit wires 30ª and 30ᵇ divided in the manner shown in Fig. 2.

A pair of compressible arms 31, 31ª, are pivotally mounted at their lower ends on the screws x at the lower end of the rear face of the handle extension 26 and said arms extend up from the lower end of said handle into the depression or recess 29 on the back of the web 25 where the opposite faces of said arms are disposed adjacent the vertical side walls of the recess. A V-shaped spring 32 which is inserted between the adjacent or facing portions of the arms urges said arms away from each other and automatically returns said arms to their normal positions after they have been moved or operated.

The upper portions of the arms are provided with shoulders and the lugs 33, 33ª projecting above such shoulders are horizontally bored to loosely carry pins 34, 34ª the heads 35, 35ª of which have the adjacent ends of the conductor wires 30ª and 30ᵇ soldered or otherwise secured to them. Tubular insulation pieces 36, 36ª firmly surround the shanks of the aforesaid pins with the exception of the outer end portions so that these ends of the pins are exposed to provide contact members that are adapted to cooperate with the conductor strips 22, 22ª to close the motor circuit. The web 25 and the tubular bosses of the slide frame are provided with bores 37, 37ª that axially aline with each other and extend horizontally in opposite directions from the respective sides of the recess 29 to the bores of the respective bosses and at right angle to the axes of the latter.

The pins and the insulation pieces above mentioned are adapted to be moved longitudinally in the respective bores 37, 37ª, by the swinging movement of the compressible arms 31, 31ª, and in their normal positions are projected through holes 38, 38ª, in the tubular guide rods 7, 7ª, forming the standard. This provides means for releasably locking the slide and motor in different positions upon the standard and also provides means for closing the electric circuit to the motor.

In order to permit the projecting ends of the pins 36, 36ª, to make contact with the metal conductor strips 22, 22ª in the guide rods the insulating fillers 23, 23ª, are provided with lateral bores 39, 39ª, that extend into the fillers to said strips and expose them.

It should be noted that the conductor strips and the fillers do not extend to the uppermost hole 38, 38ª in the guide rods, but they terminate just above the hole below said topmost hole, so that when the frame and motor is being supported in their uppermost position the motor is out of circuit and is "dead". This latter position is the one in which the frame and motor are placed in order to elevate the agitator to a plane where the bowl or container may be readily inserted or removed, and since there can be no movement of the agitator in this position there is no danger of the operator becoming injured by the rotation of such appliance. When the contact pins have engaged the conductor strips the circuit is formed through the wires 30ª, 30ᵇ, and conductor cord 30 to the motor through an off-and-on switch 28ª at the rear of the motor, such switch being preferably of the well-known type that also varies or controls the speed of the motor.

For the purpose of preventing any scattering of the ingredients during agitation the bowl 40 in which the ingredients are deposited is provided with a removable cover 41 having side-by-side central apertures through which the agitator spindles may be inserted and rotated. This cover is also provided with a feed opening 42 in which a funnel 43 is disposed so that ingredients may be added while the stirring operation is being performed and without stopping the agitators. A guard plate 44, having a lateral circumferential flange 45, is placed over the heater device with the flange inserted in the hereinbefore mentioned annular groove between the wall of the heater frame and its insulation plate. This prevents any foreign material reaching the resistance coils and shorting the circuit or damaging the heating unit.

From the foregoing it will be seen the stirring or agitating operation may be performed either with or without the application of heat. Also such operation may be performed when the slide frame and motor are supported in any of the holes 38, 38ᵃ excepting the oppositely disposed top holes, and when the latching devices are in such uppermost holes the motor is "dead", while the agitator appliances are elevated sufficiently to permit ready insertion or removal of the bowl or receptacle containing the ingredients.

Further, it will be noted that the circuit forming devices and the slide latching devices are simultaneously operated by common actuating means that are always under the ready manual control of the operator as all that it is necessary for the operator to do is to compress the arms 31, 31ᵃ manually and raise or lower the slide frame until the circuit forming and latching devices engage another pair of opposite holes in the guide rods.

What I claim is:

1. A culinary appliance comprising a base, a standard, a slide movable longitudinally on said standard, a motor and driven tool mounted on said slide, conductors associated with said standard, devices on said slide for forming an electric circuit from said conductors through said motor, a latch structure for maintaining said slide in divers adjusted positions on said standard, and common means for simultaneously operating said latch structure and said circuit forming devices.

2. A culinary appliance comprising a base, a standard consisting of a pair of spaced tubular rods, a slide movable longitudinally on said rods, a motor and driven tool mounted on said slide, conductors mounted within said rods, devices on said slide and associated with said conductors for forming an electric circuit through said motor, a latch structure for maintaining said slide in divers adjusted positions on said rods, and common means for simultaneously operating said latch structure and said circuit forming devices.

3. A culinary appliance comprising a slide, tubular guide members for said slide, a motor and driven tool on said slide, electric current conductors associated with said guide members, electric current conductors carried by said slide and connected to said motor, make-and-break devices for electrically connecting the respective conductors, latching elements for maintaining the slide in divers adjusted positions, and means for operating said make-and-break devices and said latching elements.

4. A culinary appliance comprising spaced tubular guides, a slide movable thereon, a motor and driven tool on said slide, conductors within said guides, a pair of arms pivoted on said slide, electric contact members carried by said arms and engageable with said conductors at intervals along said guides, electric conductors leading from said contact members to said motor, and latching means for supporting said slide at different locations upon said guides.

5. A culinary appliance comprising spaced tubular guides, a slide movable thereon, a motor and driven tool on said slide, conductors within said guides, a pair of arms pivoted on said slide, electric contact members carried by said arms and engageable with said conductors at intervals along said guides, electric conductors leading from said contact members to said motor, and latching means operable by said arms for supporting said slide at different locations upon said guides.

6. A culinary appliance comprising a support, a slide movable thereon and adapted to be positioned at vertically spaced intervals, a motor and driven tool on said slide, an electric circuit for said motor, a make-and-break device movable with the slide and adapted to close the circuit at spaced intervals on said support, and means for operating said make-and-break device.

7. A culinary appliance comprising a support, a slide movable to vertically spaced positions on said support, a motor and driven tool on said slide, an electric circuit for said motor, a make-and-break device movable with the slide and adapted to close the circuit at spaced intervals on said support, means for operating said make-and-break device, and latching means for maintaining said slide at different spaced locations upon said support.

8. A culinary appliance comprising a support having spaced recesses thereon, a slide movable on said support, a motor and driven tool on said slide, electric circuit conductors within said support and said slide, and connected to said motor, make-and-break devices in the circuit formed by said conductors, plungers on said slide adapted to engage said recesses to maintain the slide in divers positions on said support, and pivoted arms operatively connected to said plungers for moving the latter into and out of said recesses.

9. A culinary appliance comprising a support having spaced recesses thereon, a slide movable on said support, a motor and driven tool on said slide, electric circuit conductors within said support and slide, and connected to said motor, plungers movably mounted on said slide adapted to engage said recesses to maintain the slide in divers positions on said support, terminal pins on said plungers normally engaged with said conductors, and automatically returnable arms pivoted on said slide and operatively connected to said plungers for simultaneously operating said plungers and said terminal pins.

10. A culinary appliance comprising spaced tubular guides, having a series of recesses in the walls thereof, a slide movable longitudinally on said guides, a motor and driven tool mounted on said slide, insulated electric conductors within said guides having exposed portions alined with said recesses, reciprocable plungers on said slide adapted to enter the recesses in said guides to maintain the slide in divers positions on the guides, contact members carried by said plungers adapted to engage the exposed portions of said conductors, conductors electrically connecting said motor to the respective contact members, and reciprocable arms mounted on said slide for actuating said plungers.

11. A culinary appliance comprising a slide, tubular guide members for said slide, a motor and driven tool on said slide, electric current conductors associated with said guide members, electric current conductors carried by said slide and connected to said motor, make-and-break devices for electrically connecting the respective conductors, latching elements for maintaining the slide in divers adjusted positions, and means for operating said make-and-break devices and said latching elements.

12. A culinary appliance comprising a base, tubular guides arising from said base, a slide movable vertically on said guides, an electric motor carried by said slide, an agitator disposed above said base and operatively connected to and driven by said motor, latches for maintaining the slide in divers positions on the guides with respect to said base, means controlling the electric current to said motor, and common devices for actuating said control means and said latches.

OLIVE BAKER NICHOLS.